Patented Oct. 30, 1923.

1,472,320

UNITED STATES PATENT OFFICE.

ERNST BECKMANN, OF BERLIN-DAHLEM, GERMANY, ASSIGNOR, BY MESNE ASSIGNMENTS, TO THE CHEMICAL FOUNDATION, INC., A CORPORATION OF DELAWARE.

PROCESS FOR PREPARING A FODDER FROM STRAW OR OTHER MATERIALS CHARACTERIZED BY THEIR CONTENTS OF RAW FIBER.

No Drawing.  Application filed April 15, 1919. Serial No. 290,334.

(GRANTED UNDER THE PROVISIONS OF THE ACT OF MARCH 3, 1921, 41 STAT. L., 1313.)

*To all whom it may concern:*

Be it known that I, Professor Dr. ERNST BECKMANN, a citizen of the State of Germany, and residing at Berlin-Dahlem, Thielallee 63, Germany, have invented certain new and useful improvements in or relating to a process for preparing a fodder from straw or other materials characterized by their contents of raw fibers (for which I have filed applications in Germany, March 25, 1918; Denmark, January 18, 1919; Austria, January 20, 1919; Hungary, January 20, 1919; Norway, February 5, 1919; and France, February 10, 1919), of which the following is a specification.

In a co-pending application there is set forth a method for the preparation of a fodder from straw and similar materials by disintegrating the same, after it has been cut into small pieces, by means of caustic alkali according to which the caustic alkali acts upon the straw at ordinary temperature, that is, about 20° C. In this process not any additional heat is required and the action continues for a period of time depending upon the concentration of the caustic.

I have now found that the disintegration of the straw may be brought about by utilizing slaked lime, that is, milk of lime, instead of caustic alkali. However, slaked lime is only slightly soluble in water and does not have the same solvent effect upon the straw material as does the caustic alkali, that is, sodium and potassium hydroxides. When utilizing milk of lime the duration of the action upon the straw must, in consequence of the decreased solvent power, be considerably lengthened.

An increased effect by the milk of lime may be obtained by adding a salt of an alkali metal which reacts with calcium hydroxide with the resultant liberation of the free hydroxide of sodium, or potassium. Among these salts such materials may be mentioned, by way of example, sodium carbonate, potassium carbonate, the sulphates and bisulphates of sodium-potassium, ashes of plants, the alkaline sulphides and other compounds of similar chemical properties.

In the practice of my process I may proceed as follows:

100 ks. of straw are soaked in about 1000 to 2000 ls. of water and to this mixture there is then added about 5 ks. of calcium hydroxide in the form of milk of lime. The reaction mixture is allowed to stand for several hours, the same being frequently stirred. The supernatant liquid is drawn off and the straw thoroughly washed with water. The straw thus preliminarily treated may then be further treated with a solution of caustic alkali, that is, sodium or potassium hydroxides. Instead of adding milk of lime as outlined above, it has been found satisfactory to replace a portion of the calcium hydroxide by means of a salt of an alkali metal, and when proceeding in accordance with this method there may be added in place of the calcium hydroxide a mixture containing about, for example, 4 ks. sodium sulphate and 2 ks. of calcium hydroxide, the preceding and succeeding steps of the process being the same as those above outlined.

In order to obviate the presence of undissolved calcium hydroxide in the liquor, it is preferable to prepare the liquor in a separate vessel and after allowing the undissolved material to settle, to decant the clear supernatant liquor and employ only such decanted liquor for the disintegration of the straw.

The residue which results from the interaction of calcium hydroxide and the substances above mentioned, such as salts of the alkali metals, and which consists of salts of calcium such as sulphate or carbonate, etc., may be used in a practical way for agricultural purposes.

Furthermore, the liquor remaining after the disintegration process may also be used for agricultural purposes.

The process may be applied not only to straw but equally well to other materials having a combination similar to straw and which are characterized by the content of raw fibers, such as rush, forest grass, Indian corn stalks, chaff and the like.

I claim:

1. The process for preparing fiber from straw and other material characterized by its content of raw fiber which comprises cutting the material into small pieces and then treating with calcium hydroxide and a substance which yields a caustic alkali by interaction with calcium hydroxide at ordinary temperature.

2. The process for preparing fiber from straw and other material characterized by a content of raw fiber which comprises cutting the material into small pieces and then treating with a mixture of calcium hydroxide and sodium sulphate, the action taking place at ordinary temperature.

In testimony whereof I have affixed my signature in presence of two witnesses.

PROF. DR. ERNST BECKMANN.

Witnesses:
M. BLUMENREICH,
BRUNO BROCK.